Nov. 12, 1963     W. B. PEARSON, JR     3,110,123
EDUCATIONAL TOY
Filed Sept. 20, 1961

INVENTOR.
WILBUR B. PEARSON, JR.
BY
Kimmel & Crowell
ATTORNEYS.

United States Patent Office 3,110,123
Patented Nov. 12, 1963

3,110,123
EDUCATIONAL TOY
Wilbur B. Pearson, Jr., 1219 Military Road,
Columbus, Miss.
Filed Sept. 20, 1961, Ser. No. 139,500
7 Claims. (Cl. 46—1)

This invention relates to an educational toy or the like which will stimulate the ingenuity and creative thinking in children.

By applying their talents children will be able to readily construct a basic structure and subsequently progress to building more complex geometric patterns. The design of the present invention is such that the basic structure as well as others, more complex, are movable or can be adjusted from a relatively compact arrangement of parts to a spatially expanded structure.

An object of the invention is an educational toy or the like comprised of a plurality of cubes and elongated coupling elements assembled to form geometric structures.

Another object of the invention is an educational toy or the like which is assembled to form a compact geometric structure, but which can be adjusted while assembled to form an expanded geometric structure.

Another object of the invention is an educational toy or the like which when assembled can have added thereto additional like parts to form various geometric patterns.

Other objects and advantages of the invention will become apparent by referring to the following detailed description when taken with the accompanying drawings wherein.

Figure 1:
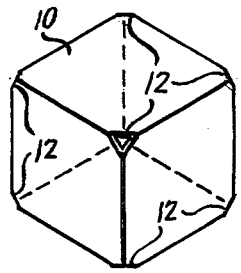
FIGURE 1 is a perspective view of one of the cubes used in the construction of the educational toy of the present invention.

Referring now to the drawings in detail, FIG. 1 illustrates one of a plurality of cubical members 10 which form part of the structure of the present invention. Each of the cubical members is identical and can be constructed from plastic or other suitable material. The cubical members can be colored or have thereon interesting designs which will present an attractive appearance to children. As shown, each of the cubical members is hollow and has corner portions defining openings therein as at 12. The cubes do not have to be hollow, but can be solid and have bores extending therethrough from diagonally opposite corners as shown by dotted lines in FIG. 6.

Figure 2:
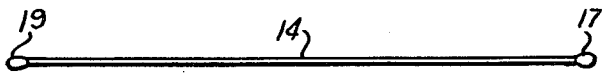
FIGURE 2 illustrates one of the elongated coupling elements which interconnect the cubes to form various patterns.
Figure 3:
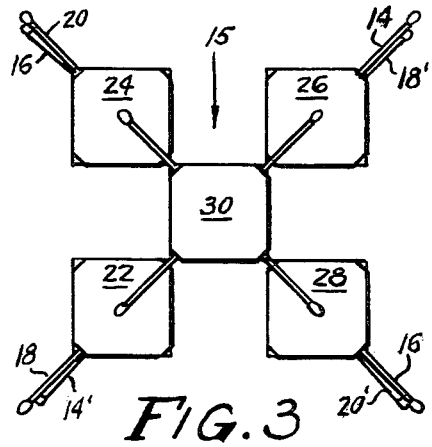
FIGURE 3 illustrates one geometric pattern formed by assembling a plurality of the elements shown in FIGS. 1 and 2.
Figure 4:
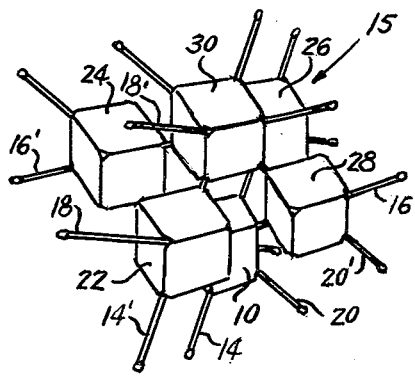
FIGURE 4 is a perspective view of the geometric pattern shown in FIG. 3.

Shown in FIG. 2 is one of the elongated coupling elements 14 which are used to interconnect a plurality of the cubical members to form the structure 15 of the present invention as shown in FIGS. 3 and 4. The coupling elements 14 can be provided at each end with removable tips 17 and 19 formed of rubber, plastic or other suitable material.

As shown, four elongated coupling elements 14, 16, 18, and 20 extend through diagonally opposite corners 12 of the cubical member 10 and through diagonally opposite corners 12 of cubical members 22, 24, 26, and 28. Additional elongated elements 14', 16', 18', and 20' extend through other diagonally opposite corners of cubical members 22, 24, 26, and 28 and through diagonally opposite corners of cubical member 30. Elongated members 18—14', 20—16', 14—18', and 16—20' extend through diagonally opposite corners of cubical members 22, 24, 26, and 28, respectively, and each pair of elongated elements cross at substantially the geometrical center of the cubical member through which they extend. The arrangement of the elongated members whereby they cross in the center of the cubes is an important feature of the invention, and effects a result which will be later described.

The portions of elongated elements 14, 16, 18, and 20 which extend through the openings in diagonally opposite corners of cubical member 10 and the portions of elongated elements 14', 16', 18', and 20' which extend through diagonally opposite corners of cubical member 30 are frictionally engaged thereby sufficient to prevent free movement of the cubical members thereon.

The portions of elongated elements 14, 16, 18, and 20 and 14', 16', 18', and 20' which extend through diagonally opposite corners of cubical members 22, 24, 26, and 28 are in frictional engagement therewith. However, the frictional engagement is not as great as that between the elongated elements and cubical members 10 and 30 and allows the cubical members to move thereon if the elongated elements are moved relative to each other.

Figure 5:
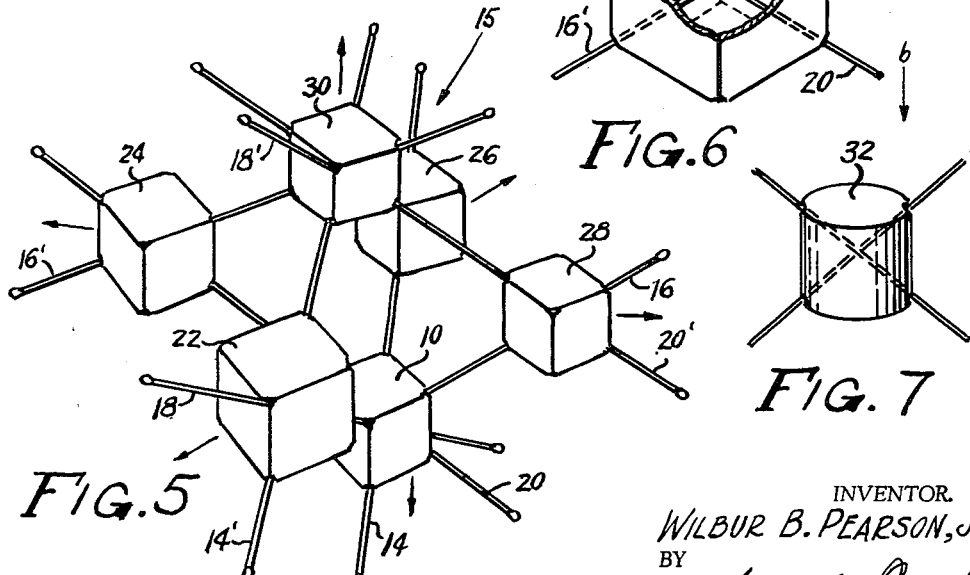
FIGURE 5 is a perspective view of the geometric pattern shown in FIG. 3 but having been spatially expanded.

To form an expanded geometric structure as illustrated in FIG. 5, cubical members 10 and 30, which are in aligned spaced relation, are moved away from one another and away from the center of the structure. When this movement occurs cubical members 22, 24, 26, and 28 are simultaneously moved radially outwardly an equal amount from the center of the structure. The outward radial movement of cubical members 22, 24, 26, and 28 results from the relative movement between elongated elements 14, 16, 18, and 20 and 14', 16', 18', and 20' which move with cubical members 10 and 30 whereby the crossing points of elongated members 18—14', 20—16', 14—18', and 16—20' are moved radially outwardly. Since the pairs of elongated members cross in the geometric center of the cubical members through which they extend, radial outward movement of the crossing point results in outward radial movement of the cubical members.

The spatially expanded structure is shown in FIG. 5, the arrows indicating the movement of the cubical members 10, 22, 24, 26, 28, and 30 away from the center of the structure 15.

Figure 6:
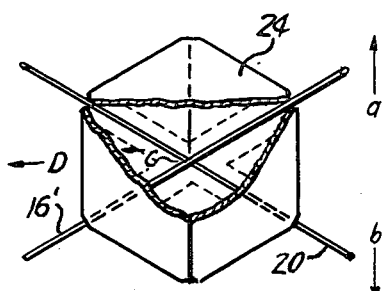
FIGURE 6 is a fragmentary view of the geometric pattern showing one of the cubical members through which elongated coupling elements extend.

Shown in FIG. 6 is one of the cubical members 24 broken away to illustrate the manner in which the elongated coupling elements 20 and 16' cross in the geometric center thereof. Movement of the elongated coupling elements 20 and 16' in the direction of the arrows a-b causes the crossing point thereof to shift in the direction of the arrow c resulting in movement of cubical member 24 in the direction of arrow D. The cubical members 22, 26, and 28 are caused to move in the same manner as above described for cubical member 24.

Figure 7:
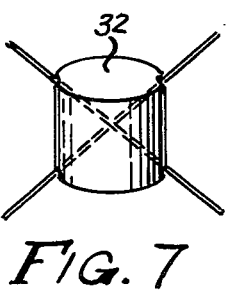
FIGURE 7 illustrates another form used for the hollow members in the structure.

Shown in FIG. 7 is another form of hollow member 32 which can be used together with elongated coupling elements 14—20 and 14'—20' to form the basic structure shown in FIGS. 3 and 4. As illustrated, the hollow member 32 is cylindrical in configuration and has aligned openings therein at the juncture of the side and end walls. A structure such as 15 shown in FIGS. 3 and 4 when constructed using a plurality of hollow members such as 32 and can be spatially expanded in the same manner to assume the geometric pattern shown in FIG. 5.

The basic structure 15 can have added thereto additional cubical members and elongated coupling elements to form structures of various geometric patterns.

While the invention has been described in its preferred embodiment, modifications and variations will become apparent to those skilled in the art. However, such modifications and variations are considered to be within the spirit of the invention and scope of the appended claims.

I claim:

1. An educational toy comprising a structure including a plurality of block-like members having aligned openings therein, elongated coupling elements extending through said openings and interconnecting said plurality of block-like members, certain of said block-like members being slidable on said elongated coupling elements in response to relative movement therebetween, and means to cause relative movement between said elongated coupling elements whereby said certain block-like members are moved outwardly from the center of the structure.

2. An educational toy comprising a structure including a plurality of hollow block-like members having aligned openings therein, elongated coupling elements extending through said openings and interconnecting said plurality of hollow block-like members, a pair of said hollow block-like members being in aligned spaced relation, each of said elongated coupling elements extending angularly through at least one of said pair of aligned spaced hollow block-like members and crossing another of said elongated elements at spaced points in a plane intermediate thereof, other of said hollow block-like members slidably supported on said crossed elongated coupling elements, the point of crossing of said elongated coupling elements disposed in the geometric center of said slidably mounted hollow block-like members, said pair of aligned spaced hollow block-like members and the elongated coupling elements extending therethrough being movable relative to each other to radially shift the crossing points of said elongated coupling elements to cause said other hollow block-like members to be radially moved.

3. An educational toy comprising a structure including a plurality of hollow members of generally cubical form, said cubical members each having corner portions defining openings therein, elongated semi-rigid coupling elements extending through diagonally opposite corner openings of said cubical members interconnecting the same, at least two of said cubical members being in aligned relation and the other cubical members being slidably mounted on said elongated coupling elements, said aligned cubical members being movable away from each other to cause outward radial movement of said other cubical members from the center of the structure.

4. An educational toy comprising a structure including a pair of spaced aligned cubical members, a plurality of cubical members disposed in a plane between said pair of cubical members, each of said cubical members having corner portions defining openings therein, elongated coupling elements extending through diagonally opposite corner openings of said cubical members interconnecting the same and said plurality of cubical members being slidably mounted on said elongated coupling elements, said aligned pair of cubical members being movable away from the center of said structure to cause equal outward radial movement of said plurality of cubical members from the center of said structure.

5. An educational toy comprising a structure including a pair of spaced aligned hollow cubical members, a plurality of hollow cubical members disposed in a plane perpendicular to the plane of said pair of aligned cubical members and between said pair of aligned cubical members, each of said hollow cubical members having corner portions defining openings therein, elongated coupling elements extending through diagonally opposite corner openings of one of said pair of aligned cubical members and each of said plurality of cubical members, other elongated coupling elements extending through diagonally opposite corner openings of the other of said pair of aligned cubical members and each of said plurality of cubical members, said plurality of cubical members being slidably mounted on said elongated coupling elements and said other elongated coupling elements, said pair of aligned cubical members being movable away from the center of the structure to cause equal simultaneous movement of said plurality of cubical members away from the center of the structure.

6. An educational toy comprising a structure including a first hollow cubical member, said cubical member having corner portions defining openings therein, elongated coupling elements extending through diagonally opposite corners of said first cubical member, second, third, fourth, and fifth cubical members disposed in a plane above said first cubical member, said elongated coupling elements extending through diagonally opposite corners of said second, third, fourth, and fifth cubical members, other elongated coupling elements extending through other diagonally opposite corners of said second, third, fourth, and fifth cubical members and crossing said first-mentioned elongated coupling elements at the geometric center of said members, said other elongated coupling elements extending through diagonally opposite corners of a sixth cubical member disposed above said second, third, fourth, and fifth cubical members, said second, third, fourth and fifth cubical members being slidably mounted on said first-mentioned and said other elongated coupling elements, said first and sixth cubical members and said elongated coupling elements being movable relative to each other to shift the crossing point of said elongated coupling members radially outwardly from the center of the structure to cause radial outward movement of said second, third, fourth and fifth cubical members.

7. An educational toy comprised of a first cube, a second cube, and four intermediate cubes, each cube having an opening in each corner thereof, four elongated rods extended diagonally through the corner openings of said first cube with one rod extending diagonally upwardly and outwardly from each corner thereof, four additional elongated rods extended diagonally through the corner openings of said second cube with a rod extending diagonally outwardly and downwardly from each corner thereof, said first and second cubes being aligned and said rods being of a length sufficient to intersect when said first and second cubes are so aligned, one of said intermediate cubes slidably mounted on each rod extending from said first cube by extension of said each rod through diagonally opposite corner openings of the last-mentioned cube and correspondingly mounted on a rod extending from said second cube by extension thereof through other diagonally opposite corner openings thereof, whereby movement of said first and second cubes towards and away from each other will vary the point of intersection of their several rods to cause corresponding changes in the relative position of said intermediate cubes to each other and to said first and second cubes.

References Cited in the file of this patent

UNITED STATES PATENTS

| | | |
|---|---|---|
| 1,472,536 | Thomson | Oct. 30, 1923 |
| 2,803,088 | Swann | Aug. 20, 1957 |

FOREIGN PATENTS

| | | |
|---|---|---|
| 749,562 | France | July 26, 1933 |